(12) United States Patent
Jeong et al.

(10) Patent No.: US 9,776,591 B1
(45) Date of Patent: Oct. 3, 2017

(54) ACTUATOR SUBASSEMBLY

(71) Applicant: Key Safety Systems, Inc., Sterling Heights, MI (US)

(72) Inventors: Dong Sik Jeong, Rochester Hills, MI (US); Chang-Hwan Ju, Rochester, MI (US); Bryan Thomas, Shelby Township, MI (US); Ho-Won Lee, Gyeonggi-do (KR); K. S. Lee, Rochester Hills, MI (US); Jae-Ik Hwang, Bloomfield Hills, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 15/098,587

(22) Filed: Apr. 14, 2016

Related U.S. Application Data

(60) Provisional application No. 62/148,418, filed on Apr. 16, 2015.

(51) Int. Cl.
*B60R 21/216* (2011.01)
*B60R 21/264* (2006.01)
*B60R 21/26* (2011.01)

(52) U.S. Cl.
CPC .......... *B60R 21/216* (2013.01); *B60R 21/264* (2013.01); *B60R 2021/26088* (2013.01)

(58) Field of Classification Search
CPC ................ B60R 21/216; B60R 21/264; B60R 2021/26088
See application file for complete search history.

(56) References Cited

U.S. PATENT DOCUMENTS

| | | | | |
|---|---|---|---|---|
| 6,422,597 B1* | 7/2002 | Pinsenschaum | ...... | B60R 21/233 280/735 |
| 6,454,300 B1* | 9/2002 | Dunkle | ................. | B60R 21/231 280/742 |
| 6,918,614 B2* | 7/2005 | Ryan | ..................... | B60R 21/233 280/736 |
| 7,275,763 B2* | 10/2007 | Thomas | ................ | B60R 21/276 280/736 |
| 7,762,584 B2* | 7/2010 | Morita | .................. | B60R 21/239 102/531 |
| 8,517,419 B2* | 8/2013 | Debler | ................ | B60R 21/2338 102/356 |
| 2006/0284404 A1* | 12/2006 | Green | ................... | B60R 21/231 280/743.2 |
| 2008/0203716 A1* | 8/2008 | Parks | .................. | B60R 21/2338 280/743.2 |
| 2010/0090445 A1* | 4/2010 | Williams | ............ | B60R 21/2338 280/728.2 |
| 2013/0334801 A1* | 12/2013 | Williams | .............. | B60R 21/239 280/739 |
| 2014/0175776 A1* | 6/2014 | Muller | .................. | B60R 21/264 280/736 |

FOREIGN PATENT DOCUMENTS

WO 2007065709 A1 6/2007
WO 2007065715 A1 6/2007

\* cited by examiner

*Primary Examiner* — Darlene P Condra
(74) *Attorney, Agent, or Firm* — Markell Seitzman

(57) ABSTRACT

The invention relates to an actuator subassembly for a vehicle safety system having a pin release actuator unit and a cradle bracket for holding the actuator unit and attaching to an airbag module. Further the invention relates to an airbag module with said actuator subassembly and a method of mounting a releasable tether on an airbag module by means of said actuator subassembly.

13 Claims, 7 Drawing Sheets

ACTUATOR SUBASSEMBLY

FIELD OF THE INVENTION

This application claims the benefit of U.S. Provisional Application 62/148,418, filed on Apr. 17, 2015. The disclosure of the above application is incorporated herein by reference.

The invention relates to an actuator subassembly with an actuator unit held in a cradle bracket. Moreover, the invention also relates to an airbag module of a vehicle safety system with the actuator subassembly as well as a method of mounting a releasable tether at an airbag module by means of the actuator subassembly.

BACKGROUND OF THE INVENTION

In the case of modern vehicle safety systems, especially in the case of airbag modules, it is endeavored to adapt the safety system more individually to different parameters of a crash situation. It is a known and advantageous possibility to make use of tensile means such as tethers, by release of which flow orifices are opened or closed. Moreover, by such tensile means also the airbag geometry can be influenced and an additional airbag volume can be released.

For the active release of a tether a so-called tether activation unit "TAU" is required. Such TAU are usually stressed for shearing by comparatively small shear force loads. For this reason, in WO 2007/065715 A1 for actuating a vehicle safety system pyrotechnic actuator units are made which have a plastic case and can be cheaply manufactured.

In WO 2007/065709 A1 an airbag module having an actuator unit in the form of a TAU is described in which a retaining means is provided to restrict the free mobility of a fragment separated after activation of the actuator unit. In this way, undesired contact with a vehicle occupant or damage of the airbag module by the separated fragment is largely excluded.

It is the object of the invention to provide a cheap and easily manufactured actuator subassembly that meets all safety requirements made to pyrotechnic actuators as regards movable components or fragments and at the same time can be easily mounted in a vehicle safety system.

SUMMARY OF THE INVENTION

An actuator subassembly for an airbag module has a pin release actuator unit and a cradle bracket for holding the actuator. The actuator unit has an actuator, a housing and a releasable pin for holding a looped end of a tether. The pin extends from one end of the housing. The actuator is housed inside the housing and configured to be connected at an opposite end to an electrical connection.

The cradle bracket has a "U" shaped housing part and a snap-on retaining clip, the "U" shaped housing part has an open first end, a closed second end with an aperture and a receiving chamber to accommodate the actuator unit disposed between said ends. Upon assembly of the actuator to the cradle, the actuator can move relative to the cradle bracket to receive a loop end of a tether, and when moved toward the closed end of the "U" shaped housing part, the releasable pin enters the aperture fixing said loop about the pin. The snap-on retaining clip has a pair of leg extensions fixing the actuator unit in the cradle.

The "U" shaped housing part has a plurality of feet projecting along the sides. The feet are configured to fit into apertures in a housing module to fix the actuator subassembly to the module on assembly. The actuator is, preferably, a pyrotechnic device and the releasable pin is released by actuation of the pyrotechnic device. This causes the pin to move through or withdraw from said aperture on actuation of the pyrotechnic device to release the loop of said tether. Prior to its activation, the actuator unit is undisplaceably attached to the cradle bracket. Inside the cradle bracket at least one stop is formed to restrict movement of the housing after activation of the actuator unit. The subassembly has a tether fixed to the pin of the actuator unit prior to activation of the pyrotechnic actuator unit. In the actuator, there is a pre-fabricated electric igniting unit including a pyrotechnic charge. The cradle bracket can be a plastic part. The actuator unit and cradle bracket are firmly connected to each other prior to activating the actuator unit.

BRIEF DESCRIPTION OF THE DRAWINGS

The invention will be described by way of example and with reference to the accompanying drawings in which.

DETAILED DESCRIPTION OF THE INVENTION

Figure 1A:
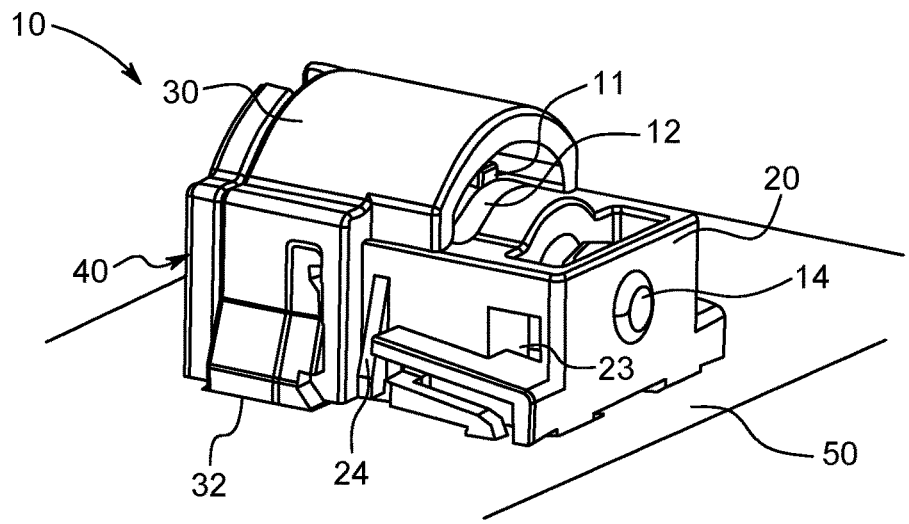
FIG. 1A is a top perspective view of the actuator subassembly of the present invention shown mounted on a portion of an airbag module plate.
Figure 1B:
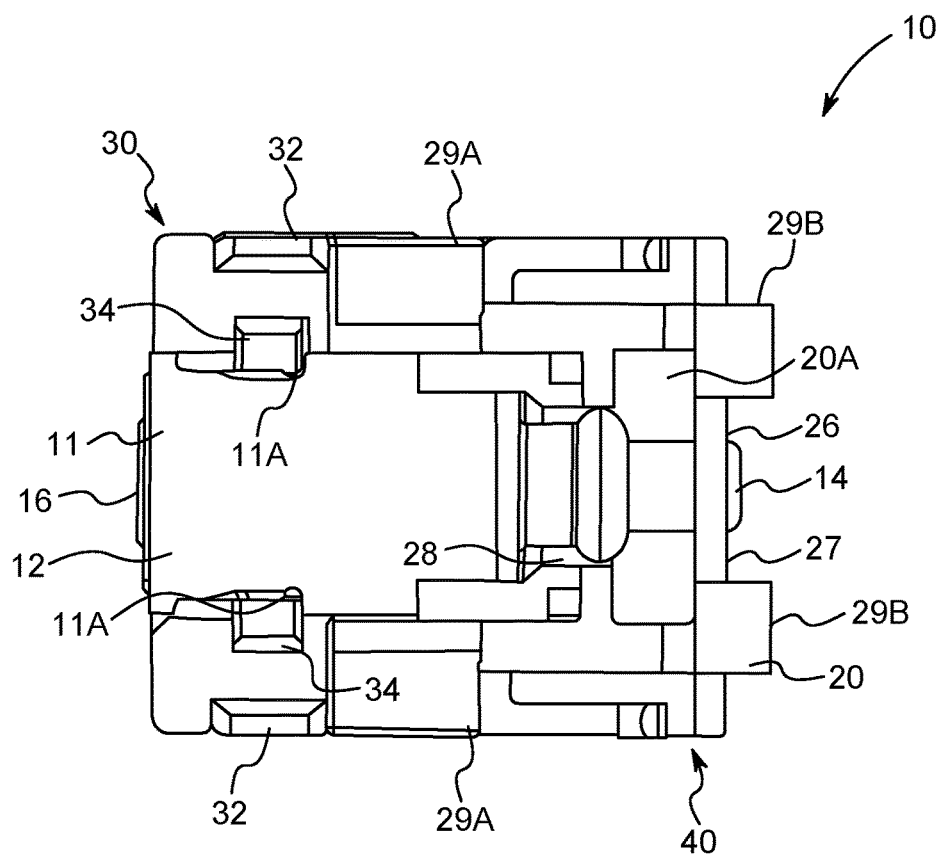
FIG. 1B is a bottom plan view of the actuator subassembly illustrating the actuator mounted into the cradle bracket of the present invention.
Figure 1C:
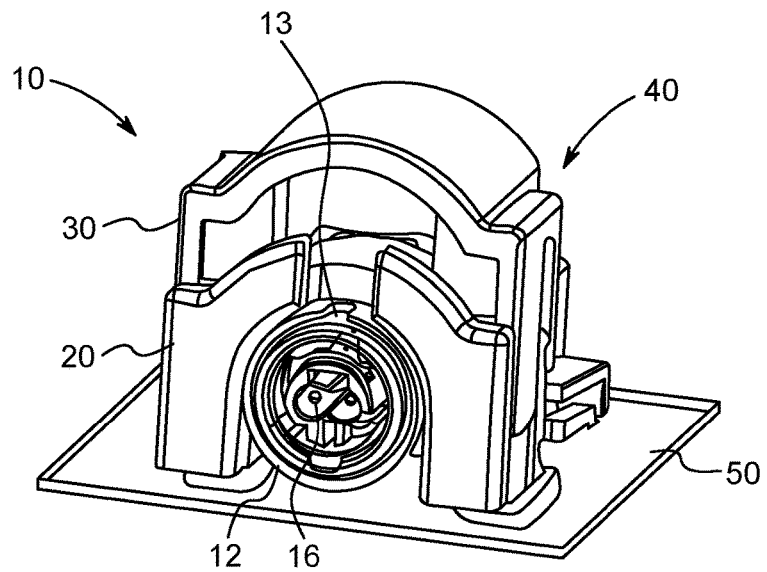
FIG. 1C is an end perspective view of the cradle bracket and actuator showing the electrical connector end of the actuator of the present invention. The actuator subassembly being affixed to a portion of an airbag module plate.

An airbag actuator subassembly 10 for an airbag module is illustrated in FIGS. 1A-1C. As shown, the airbag actuator subassembly 10 has a pin release actuator unit 12 and a cradle bracket 40 for holding the actuator 12. The actuator unit 12 has a housing 11 and a release pin 14 as illustrated. The cradle bracket 40 has a "U" shaped housing part 20 and a snap-on retaining clip 30 as illustrated. The "U" shaped housing part 20 is designed to hold the actuator 12 between sides of the actuator housing 20.

Figure 2A:
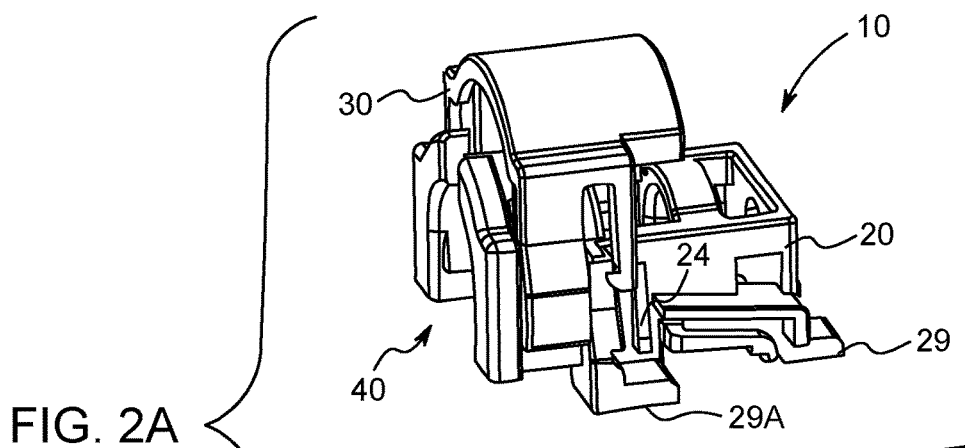
FIG. 2A is a perspective view of the actuator subassembly shown above an airbag module plate having a plurality of apertures for receiving the cradle bracket of the present invention.
Figure 2A:
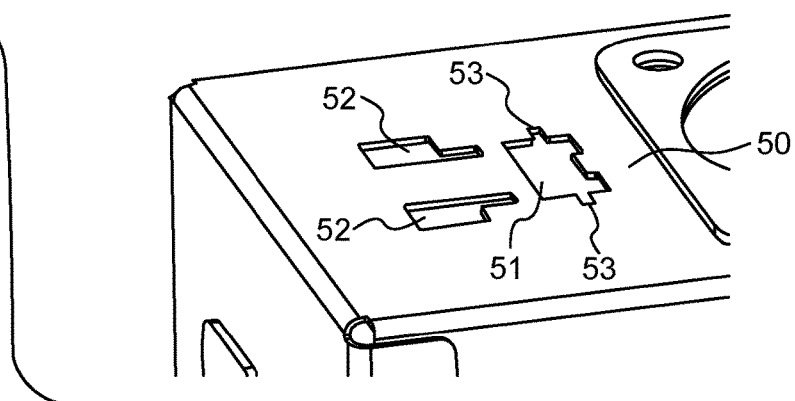
Figure 2B:
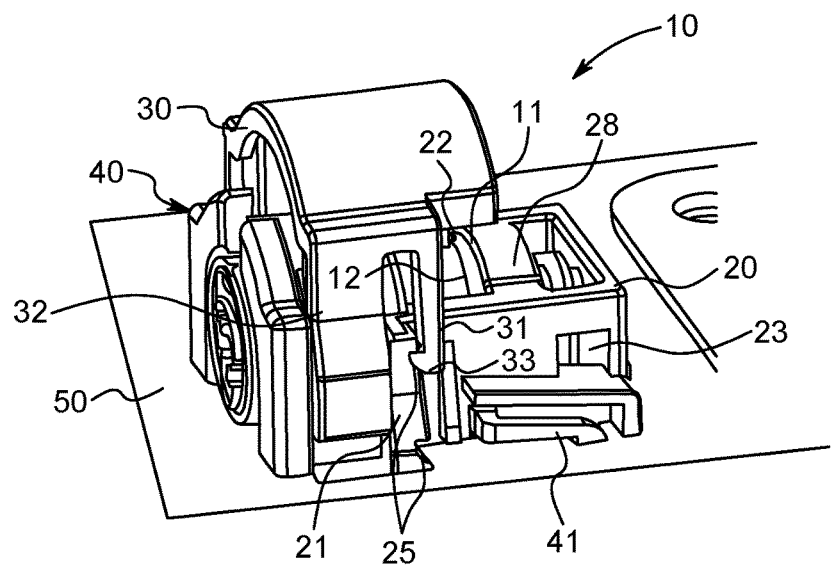
FIG. 2B is an illustration of the actuator subassembly positioned into the apertures on the airbag module plate.

The retaining clip 30, as illustrated in FIG. 2B, is shown in a pre-assembly position where it is retained by leg extensions 31 which act as locking arms on each side of the clip 30 that are designed to be held on protrusion 21 having upper and lower recesses 25. The leg extensions 31 have a projecting tip 33 that engages the notches or recesses 25 in such a way it holds the retaining clip 30 in an unclipped and non-final assembly condition. In this position, the retaining clip 30 is extended slightly above the housing part 20 as illustrated in FIGS. 2A and 2B. The housing 20 includes a ramp or rib 24 as illustrated. As the leg extension 31 is pushed down it moves out of the top notch 25 and starts to ride down the side of the adjacent wall of the housing 20. However, as the leg extension 31 moves down the wall of the housing 20 that engages the ramp 24 until the leg extension 31 gets to the bottom of the ramp 24 where it moves in a manner to snap into the lower notch 25. Once in the lower notch 25, the leg extension 31 is prevented from moving out of the lower notch 25 because of an adjacent perpendicular surface of the ramp 24.

Figure 2C:
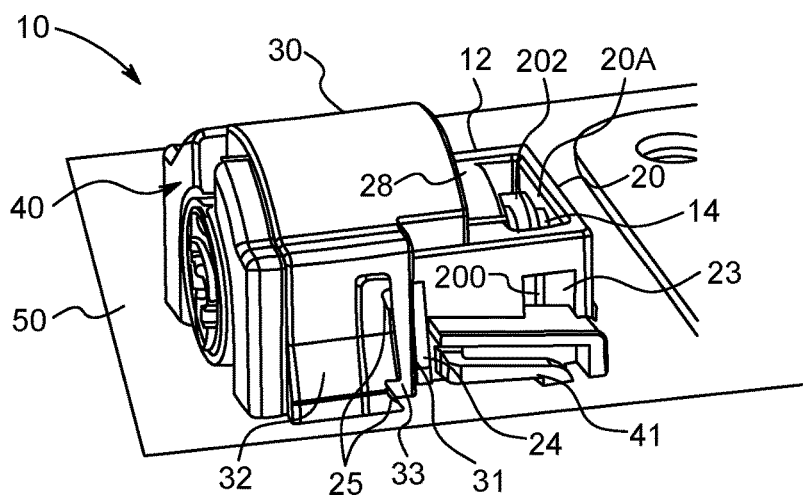
FIG. 2C is an illustration of the actuator subassembly wherein the retaining clip is pressed down into a locked positon onto the cradle bracket housing portion and the plate of the airbag module.
Figure 2D:
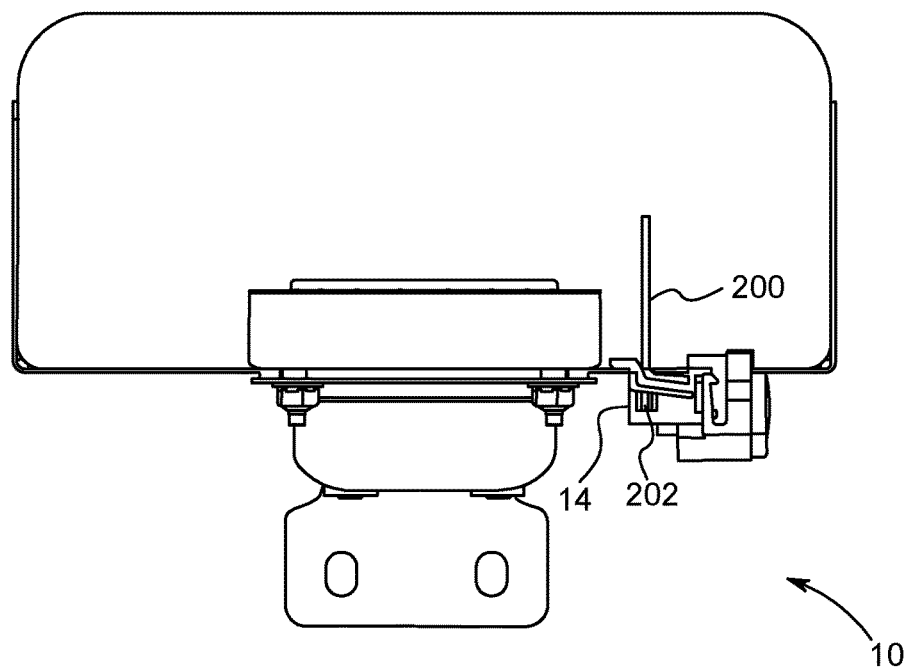
FIGS. 2D and 2E show alternative looped ends of a tether.
Figure 2E:
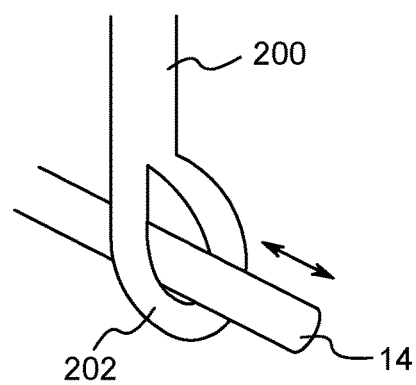
Figure 3:
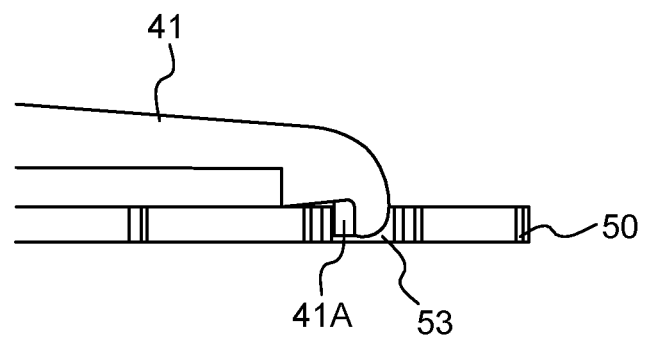
FIG. 3 is an illustration of a retention foot on the cradle housing portion that is adapted to fit into an aperture on each side of the plate to help reduce any movement of the actuator subassembly when mounted to the plate.

In FIG. 2C, when a downward pressure is applied, the retaining clip 30 moves inwardly such that the pair of legs 32 on the retaining clip 30 enter apertures 52 on the airbag module plate 50 in such a way that locks the retaining clip 30 into the module plate portion 50 as illustrated. When this occurs, the projecting tip 33 on the leg extension 31 enters the notch or recess 25 closest to the plate portion 50. When this occurs, the subassembly 10 is in its final assembly configuration. A tether 200 shown in FIG. 2C can be mounted on the release pin 14. The release pin 14 extends from the actuator 12 forward through a closed end wall 27 into an aperture 26. When in this position, the cantilevered release pin 14 is supported not only by the actuator 12 held at the location 28 but also by the closed end wall 27. This gives a full and complete support of the tether 200 to be restrained. FIGS. 2D and 2E show examples of looped ends 202 of a tether 200. The tether 200 can be a thin rope that provides a quick reaction time when the pin 14 is pulled. A window 23 is provided on each side of the housing part 20. This window 23 allows one to observe that the tether loop as illustrated is properly looped around the pin 14 on final assembly of an airbag.

The tether 200, when restrained in this position, prevents the airbag from fully deploying or can be used to keep a vent either open or closed. However, when the actuator 12 is activated, the release pin 14 can either be pulled or pushed to create a free space such that it allows the tether loop to be free of the release pin 14. Once this occurs, the tether 200 no longer restrains the airbag deployment or vents.

As shown in FIG. 1C, the electrical connection end 16 is illustrated. At the top of the actuator 12 there is a slot 13. This slot 13 provides an orientation direction such that when the actuator 12 is positioned into the cradle bracket 40 the slot 13 will be in a proper vertical positon as illustrated. This ensures that the electrical connection will always be made properly as it also has slide in features that allow this to occur.

With reference to FIG. 2A, the actuator subassembly 10 is illustrated with a snap-on clip 30 in the upright extended position. In this position, the actuator 12 is free to move longitudinally forward or back as illustrated. Once the assembly is aligned with the apertures 52 on each side and 51 and 53 on the end, the projecting feet 29A and 29B on the housing part 20 are adapted to fit into the apertures 51, 52, 53 on the plate 50 as shown in FIG. 2A.

As shown in FIG. 2B, once the subassembly 10 is positioned on top of these apertures 51, 52, 53 the subassembly 10 is then moved directionally forward illustrated by the dashed arrow. When this occurs, the feet 29A, 29B are moved to a forward position within the plate 50 and are interlocked into the plate 50. At this point, the subassembly 10 is still free to move backward from this forward position if desired and the actuator 12 can be moved backward to accept the tether loop about the release pin 14 as it will be pulled back allowing a tether loop to drop into the opening 20A such that the actuator 12 when slid forward will pass the pin 14 through the loop thus securing the tether 200. Once the pin 14 is pushed into the forward aperture 26 of the closed wall 27. The tether 200 is no longer free to be disengaged until the actuator 12 is activated by a pyrotechnic device internal of the actuator housing 11. When the device is in the fully forward position, the retaining clip 30 can be pushed downwardly, as previously mentioned, the legs 32 will then engage the aperture 52 on each side of the device and the leg extension 31 with the projecting tip 33 will engage the notch 25 closest to the plate 50 on each side of the bracket 40 as illustrated in FIG. 2C.

In order to keep the subassembly 10 from vibrating or moving, a retaining leg 41 is provided. The retaining leg 41 fits in a narrow slot or aperture 53 on each side of the housing plate 50. This retaining leg 41 has a projecting foot 41A that engages the aperture 53 on the plate 50 and provides a tension on the device such that it cannot move forward or backward when locked in this position. As further illustrated, when referring back to FIG. 2B, a tension leg 22 is provided that pushes on the actuator 12. This tension leg 22 provides a spring loaded feature and creates a small downward force on the actuator 12 that helps preload the actuator 12 in such a fashion that it will not rattle inside the housing structure 20 or cause any vibrational noises. As can easily be appreciated, this cradle bracket 40 having a snap-on retaining feature 30 and an housing structure 20 as illustrated creates a simple way of holding a cylindrical type actuator device 12.

Figure 4A:
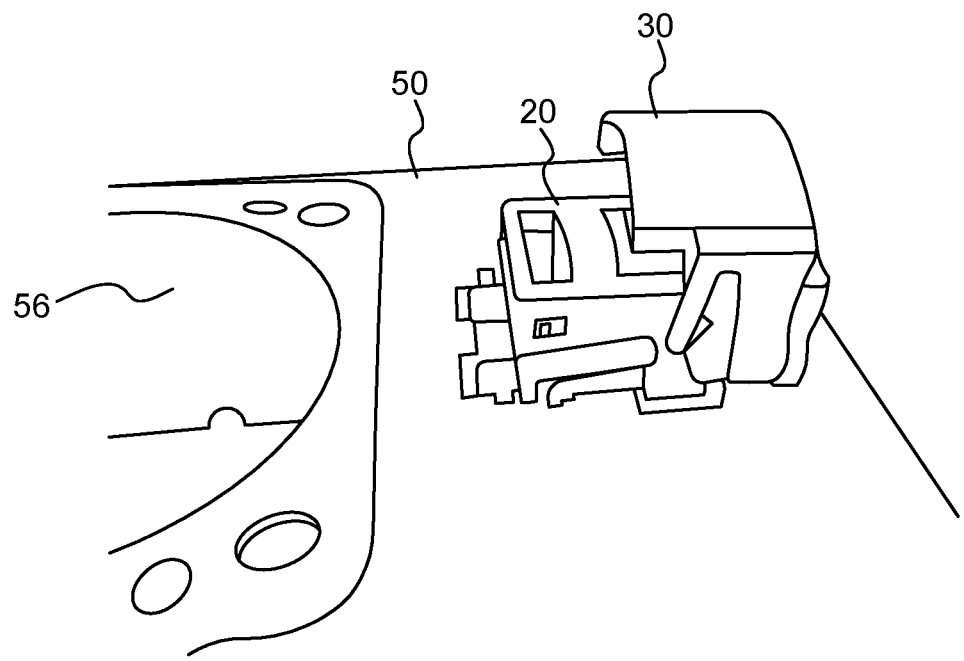
FIG. 4A is a perspective view of the cradle bracket without the actuator wherein the cradle bracket is shown mounted onto an airbag module housing.
Figure 4B:
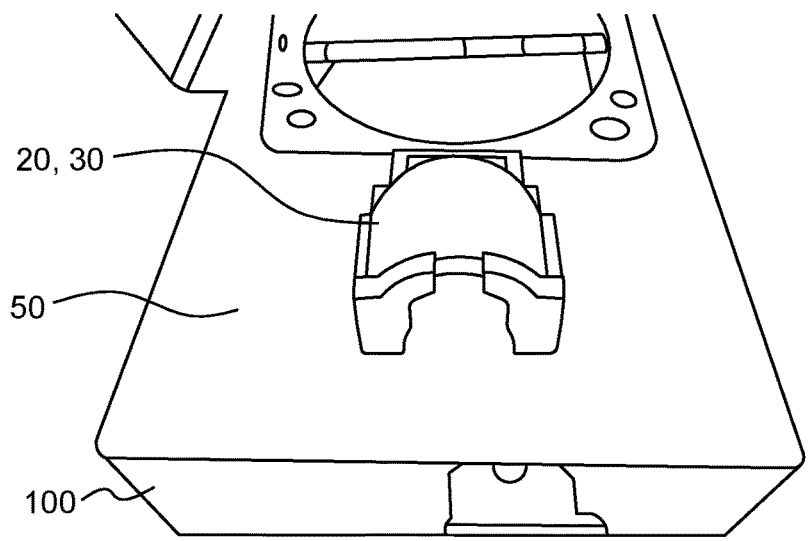
FIG. 4B is an end perspective view showing the cradle bracket mounted on the airbag module housing and affixed to the airbag module plate.
Figure 4C:
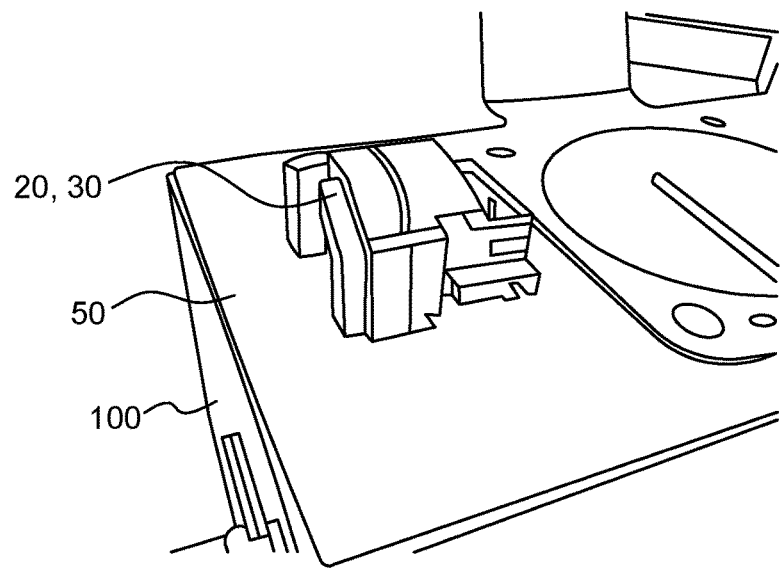
FIG. 4C is a side perspective view of the cradle bracket mounted on the airbag module housing and affixed to the airbag module plate.

FIGS. 4A, 4B and 4C show the housing portion 20 and the retaining clip portion 30 mounted on an airbag module assembly 100. The airbag module assembly 100 has the plate 50 shown in a more full view. The airbag module housing 100 has an opening 56 for receiving an airbag inflator and an airbag. A tether for the airbag would then be mounted on the actuator release pin 14 when the subassembly 10 is assembled onto the module 100. The actuator 12 itself is not illustrated in these figures to show the simplicity of the cradle bracket 40 design and its unique way of attachment of the cradle bracket 40 to the plate 50.

With reference back to FIG. 1B, an underside view of the actuator subassembly 10 is illustrated. In this illustration, the retaining clip 30 shows the legs 32 on each side of the lower housing part 20. The legs 32 project slightly inward and will be received in the plate 50 as previously discussed. Internal of the housing part 20 are illustrated projecting ribs 34. These projecting ribs 34 project inwardly slightly from the housing and are designed to enter into notches 11A that were formed into the actuator housing 11. When these legs 34 engage the recessed notches 11A on each side of the actuator 12 as the retaining clip 30 is pressed into full engagement this prevents the actuator 12 from moving longitudinally down its length. When this occurs, the release pin 14 is fixed into the aperture 26 as shown. In this condition, the actuator 12 and cradle bracket 40 are locked into a fixed position. Prior to being locked in this fixed position, a tether loop preferably is mounted onto the release pin 14. When the actuator 12 receives an electrical signal through the connector 16 at the opposite end a pyrotechnic squib internal of the actuator housing 11 will be fired creating a chamber pressure that will either push the release pin 14 outward or pull the release pin 14 inwardly into the actuator assembly 10. In doing so, as the release pin 14 moves longitudinally outward or inward, the opening 20A where the tether loop is positioned will be free of the pin 14 in such a fashion that the tether 200 is released and the airbag can reach full deployment or a vent opened or closed if so desired.

Figure 5A:
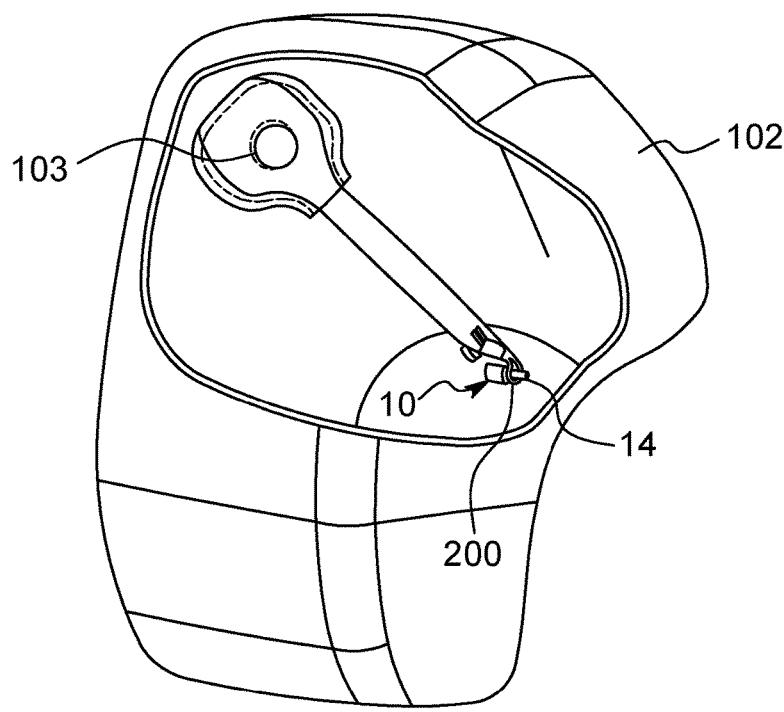
FIG. 5A is a cut away view of an airbag with the vent in the closed position, pin puller not activated and tether engaged.
Figure 5B:
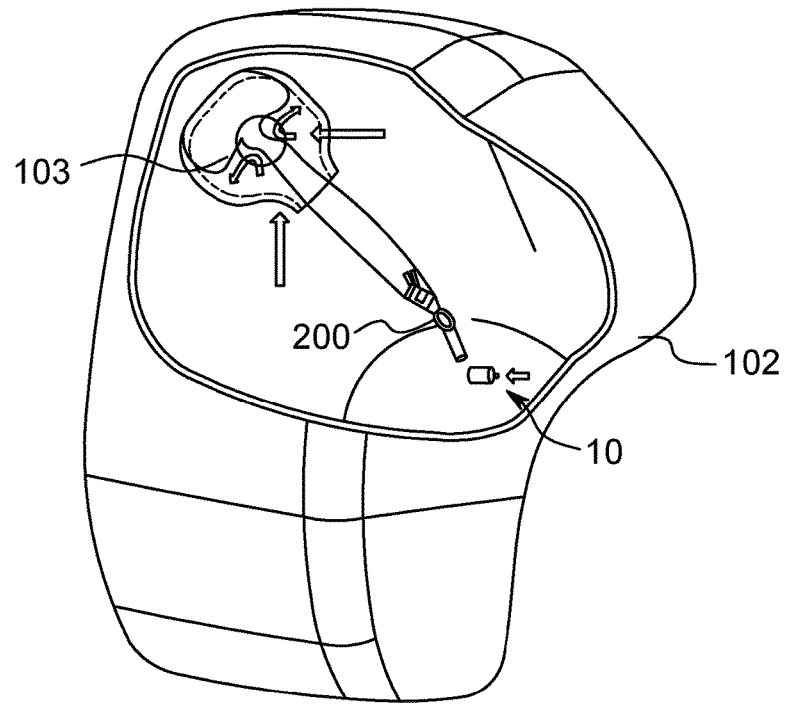
FIG. 5B is a cut away view of an airbag with the vent in the open position, pin puller activated and tether disengaged.

With reference to FIGS. 5A and 5B, in FIG. 5A, the airbag cushion 102 has an internal tether 200 with a looped end 202 secured on the pin 14 of the pin puller assembly 10. The tether 200, when held by the pin 14, holds a vent opening 103 closed at the opposite end. Under this condition, the inflation gases can fully inflate the airbag cushion 102. In FIG. 5B, the airbag cushion 102 is shown when the pin puller 10 has been activated retracted the pin 14 to release the tether 200 allowing the vent to open and inflation gases to escape.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An actuator subassembly for an airbag module comprises:
   a pin release actuator unit, the actuator unit having an actuator, a housing and a releasable pin for holding a looped end of a tether, the pin extending from one end of the housing, the actuator being housed inside the housing and configured to be connected at an opposite end to an electric connection;
   a cradle bracket for holding the actuator, the cradle bracket having a "U" shaped housing part and a snap-on retaining clip, the "U" shaped housing part having an open first end, a closed second end with an aperture and a receiving chamber to accommodate the actuator unit disposed between said ends and a pair of upper notches or recesses and a pair of lower notches or recesses for holding the snap-on retaining clip, the snap-on retaining clip being held in an unclipped and non-final assembly configuration extended slightly above the U-shaped housing part by the pair of upper notches; and
   wherein upon assembly of the actuator to the cradle, the actuator can move relative to the cradle bracket to receive a loop end of a tether, and when moved toward the closed end of the "U" shaped housing part, the releasable pin enters the aperture fixing said loop about the pin, the snap-on retaining clip having a pair of leg extensions fixing the actuator unit in the cradle in a final locked assembly configuration by pushing the snap-on retainer clip downwardly as the pair of leg extensions move from the pair of upper or top notches into the pair of lower notches or recesses.

2. The actuator subassembly for an airbag module of claim 1 wherein the "U" shaped housing part has a plurality of feet projecting along the sides, the feet are configured to fit into apertures in a housing module to fix the actuator subassembly to the module on assembly.

3. The actuator subassembly for an airbag module of claim 1 wherein the actuator is a pyrotechnic device.

4. The actuator subassembly for an airbag module of claim 3 wherein the releasable pin is released by actuation of the pyrotechnic device.

5. The actuator subassembly for an airbag module of claim 4 wherein the pin moves through said aperture on actuation of the pyrotechnic device to release the loop of said tether.

6. The actuator subassembly according to claim 3, wherein the subassembly comprises a tether fixed to the pin of the actuator unit prior to activation of the pyrotechnic device.

7. The actuator subassembly according to claim 3, characterized in that the cradle bracket is firmly connected to the actuator unit prior to activating the pyrotechnic device.

8. The actuator subassembly according to claim 1, wherein prior to its activation the actuator unit is undisplaceably attached to the cradle bracket.

9. The actuator subassembly according to claim 1, wherein in the cradle bracket at least one stop is formed to restrict movement of the housing after activation of the actuator unit.

10. The actuator subassembly according to claim 1, wherein in the actuator a pre-fabricated electric igniting unit including a pyrotechnic charge is received.

11. An actuator subassembly according to claim 1, wherein the cradle bracket is a plastic part.

12. The actuator subassembly according to claim 1, wherein the actuator and cradle bracket are firmly connected to each other prior to activating the actuator unit.

13. The actuator subassembly according to claim 12, wherein the actuator and/or the cradle bracket are made of plastic material.

* * * * *